United States Patent
Suzuki

(10) Patent No.: US 7,946,279 B2
(45) Date of Patent: May 24, 2011

(54) STRADDLE TYPE VEHICLE HAVING BREATHER DEVICE

(75) Inventor: Daisuke Suzuki, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 161 days.

(21) Appl. No.: 12/538,135

(22) Filed: Aug. 8, 2009

(65) Prior Publication Data

US 2010/0044136 A1  Feb. 25, 2010

(30) Foreign Application Priority Data

Aug. 8, 2008 (JP) .................. 2008-206367

(51) Int. Cl.
*B62K 11/00* (2006.01)
(52) U.S. Cl. .................. 123/572; 180/219
(58) Field of Classification Search .......... 180/219; 123/572, 573, 574
See application file for complete search history.

(56) References Cited

U.S. PATENT DOCUMENTS

| | | | |
|---|---|---|---|
| 5,514,015 A * | 5/1996 | Okazawa et al. | 440/88 L |
| 6,205,987 B1 * | 3/2001 | Shigedomi et al. | 123/583 |
| 7,637,236 B2 * | 12/2009 | Ochiai et al. | 123/90.33 |
| 7,644,706 B1 * | 1/2010 | Yoshida et al. | 123/572 |
| 7,651,425 B2 * | 1/2010 | Shimizu | 475/5 |
| 2007/0261906 A1 * | 11/2007 | Yao et al. | 180/292 |

FOREIGN PATENT DOCUMENTS

| | | |
|---|---|---|
| JP | 05-179923 | 7/1993 |
| JP | 2000-087722 | 3/2000 |
| JP | 2000-337125 | 5/2000 |
| JP | 2002-285817 | 3/2002 |
| JP | 2005-016333 | 1/2005 |
| JP | 2007191105 A * | 8/2007 |

OTHER PUBLICATIONS

English Translation of Patent Abstract 2000-087722, Takahashi, Katsunori, Mar. 28, 2000, p. 1.
English Translation of Patent Abstract 2000-337125, Kurata, Koji, May 12, 2000, p. 1.
English Translation of Patent Abstract 2002-285817, Haneda, Masatoshi, Mar. 10, 2000, p. 1.
English Translation of Patent Abstract 2005-016333, Ishikawa, Hideo, Jan. 20, 2005, p. 1.
English Translation of Patent Abstract 05-179923, Tsutsumigoshi, Shinobu, Jul. 20, 1993, p. 1.

* cited by examiner

*Primary Examiner* — Kevin Hurley
(74) *Attorney, Agent, or Firm* — Keating & Bennett, LLP

(57) ABSTRACT

A motorcycle (1) includes an OHC engine (13) and a fuel tank (22) closely above the engine (13). The engine (13) includes a crankcase (17), a cylinder block (18), a cylinder head (19), a cylinder head cover (20), and an oil catch tank (37) that is provided on the right side portion of the cylinder head (19) and cylinder head cover (20) and configured to separate oil from blow-by gas supplied from the crankcase (17) through the cylinder block (18). The oil catch tank (37) includes lower breather chambers (37a, 37c) formed in the cylinder head (19) and upper breather chambers (37b, 37d) formed in the cylinder head cover (20). The oil catch tank (37) is arranged as high as possible regardless of almost no space between the cylinder head (19) and the fuel tank (22).

20 Claims, 9 Drawing Sheets

STRADDLE TYPE VEHICLE HAVING BREATHER DEVICE

This application claims priority under 35 U.S.C. §119 to Japanese Patent Application No. 2008-206367 filed on Aug. 8, 2008, the entire disclosure of which is incorporated herein by reference in its entirety.

BACKGROUND

1. Field of the Invention

The preferred embodiments of the present invention relate, inter alia, to a straddle type vehicle, and more specifically, to a straddle type vehicle having a breather device (or breather).

2. Description of the Related Art

Japanese Unexamined Laid-open Patent Publication No. 2005-16333 (hereinafter referred to as "JP 2005-16333 A") discloses a breather device for an internal combustion engine small in suction amount of oil mist and capable of being installed without increasing the height and the total width of the internal combustion engine. The breather device is provided with a gas-liquid separation chamber (hereinafter referred to as an "oil catch tank") for separating oil contained in gas discharged from a crank chamber at a side portion of a cylinder block or a cylinder head located on opposite side of a cam chain chamber or a push rod chamber with respect to a cylinder hole. Furthermore, in an internal combustion engine equipped with a generator chamber accommodating an AC (alternating-current) generator driven by a crankshaft at the end portion of the crankshaft, it is known that an oil catch tank for separating oil contained in gas discharged from a crank chamber is provided at a side portion of a cylinder block or a cylinder head and above the generator chamber, while the crank chamber is communicated with the generator chamber and the generator chamber is communicated with the inlet side of the oil catch tank (see, e.g., Japanese Patent No. 3,329,331, Japanese Patent No. 3,917,303, Japanese Unexamined Laid-open Patent Publication No. 2002-285817, Japanese Unexamined Laid-open Patent Publication No. 5-179923).

The breather device for the internal combustion engine disclosed by JP 2005-16333 A has disadvantageous. In particular, its internal combustion engine is a four-stroke V-type two-cylinder engine. One of the cylinders is laid substantially horizontally, and the other cylinder is provided substantially vertically. The oil catch tank is provided on a side portion of the cylinder block of the upright cylinder. It is, however, preferable to provide the oil catch tank in a position as high as possible since it is also necessary to separate oil from gas introduced into the cylinder head.

In a motorcycle, a fuel tank is normally provided closely above an engine, and therefore there is no sufficient space for arranging the oil catch tank above the cylinder head. Furthermore, within a cylinder head of an OHC (Over Head Camshaft) engine, a number of components, such as, e.g., camshafts, cams, cam holders, valves, and spark plugs, are accommodated, and therefore it would be extremely difficult to arrange the oil catch tank in the cylinder head.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a straddle type vehicle capable of arranging an oil catch tank in a position as high as possible even when there is almost no space between a cylinder head and a fuel tank.

According to the first aspect of the present invention, a straddle type vehicle according to a preferred embodiment of the present invention includes an OHC engine and a fuel tank. The fuel tank is provided closely above the OHC engine. The OHC engine includes a crankcase, a cylinder block, a cylinder head, a cylinder head cover, and an oil catch tank. The cylinder block is provided on the crankcase. The cylinder head is provided on the cylinder block. The cylinder head cover is attached to the cylinder head so as to cover the cylinder head. The oil catch tank is arranged on a side portion of the cylinder head and the cylinder head cover to separate oil from gas supplied from the crankcase via the cylinder block. The oil catch tank includes a lower breather chamber formed in the cylinder head and an upper breather chamber formed in the cylinder head cover.

According to the second aspect of the present invention, a straddle type vehicle according to a preferred embodiment of the present invention is equipped with an OHC (Over Head Camshaft) engine and a fuel tank provided closely above the OHC engine including a crankcase, a cylinder block, a cylinder head, and a cylinder head cover arranged one above the other. The straddle type vehicle is provided with an oil catch tank for separating oil contained in gas discharged from the crankcase, and a passage which communicates the crankcase with the oil catch tank. The oil catch tank is formed as one side portion of the cylinder head and the cylinder head cover and provided with a plurality of breather chambers including at least one lower breather chamber formed in the cylinder head and one upper breather chamber formed in the cylinder head cover. The plurality of breather chambers is arranged so that the gas flows in a zigzag manner therethrough.

In this disclosure, it should be understood that the OHC engine also includes, for example, an SOHC (Single Over Head Camshaft) engine and a DOHC (Double Over Head Camshaft) engine. The straddle type vehicle includes, for example, an ATV (All Terrain Vehicle), such as, e.g., a three-wheel buggy and a four-wheel buggy in addition to the motorcycle as will be detailed.

According to the preferred embodiments of the present invention, the oil catch tank can be provided in a position as high as possible even if there is almost no space between the cylinder head and the fuel tank.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

Figure 1:
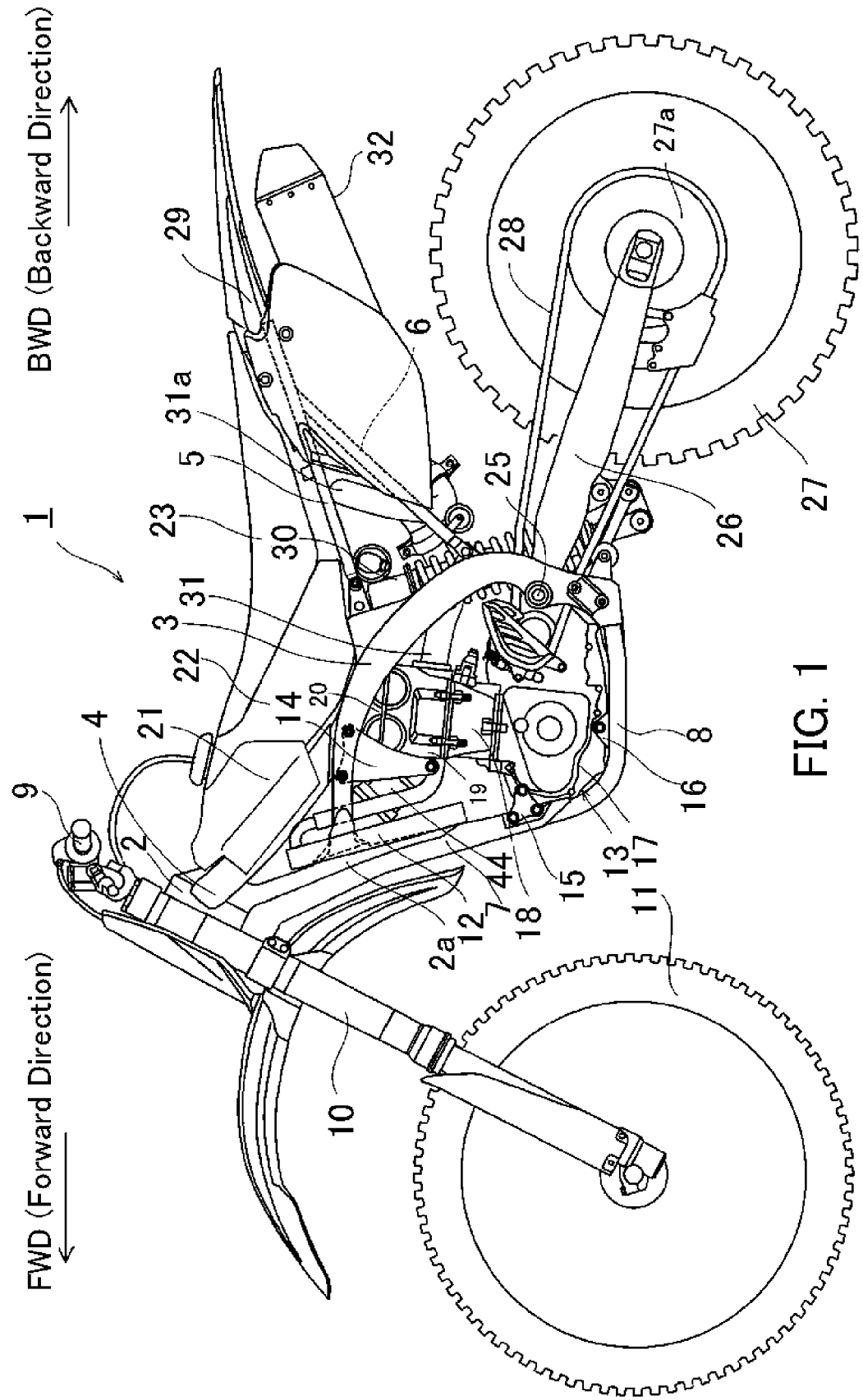
FIG. 1 is a left side view showing the general structure of a motorcycle according to a preferred embodiment of the present invention.

Preferred embodiments of the present invention will be described in detail in conjunction with the accompanying drawings in which the same or corresponding portions are denoted by the same reference characters and their description will not be repeated.

General Motorcycle Structure

FIG. 1 is a left side view of a motorcycle 1 according to a preferred embodiment of the present invention as viewed in the forward direction (FWD) of the motorcycle 1. Referring to FIG. 1, the motorcycle 1 is an off-road type motocross type motorcycle equipped with a single-cylinder DOHC (Double Over Head Camshaft) engine 13, a front wheel 11, a rear wheel 27, a handle 9, a seat 23, and a fuel tank 22.

A pair of main frames 3 is connected to a connection portion 2a. The connection portion 2a is formed so as to extend downward and slightly backward from the head pipe 2. The main frames 3 are formed so as to extend backward and slightly downward from the connection portion 2a.

A pair of tank frames 4 is arranged between the back portion of the head pipe 2 and the upper portions of the pair of main frames 3. The front portion of the fuel tank 22 is arranged between the pair of the tank frames 4. A seat frame 5 that extends backward and slightly upward is provided behind the main frames 3. A backstay 6 is provided between each of the main frames 3 and the seat frame 5.

A down frame 7 that extends downward and slightly backward is provided under the head pipe 2. A lower frame 8 that connects the down frame 7 and the main frame 3 is provided at the lower end of the down frame 7.

A handle 9 is rotatably provided at the upper portion of the head pipe 2. A pair of front forks 10 is provided under the head pipe 2. A front wheel 11 is rotatably provided at the lower ends of the pair of the front forks 10. A radiator 12 is provided between the down frame 7 and the engine 13. The radiator 12 is configured to cool water and cool the engine 13 with the cooled water.

The engine 13 is provided under the main frames 3 and behind the down frame 7. The engine 13 is supported by support plates 14 to 16. The support plate 14 is fixed to the main frame 3. The support plate 15 is fixed to the down frame 7.

Another support plate 16 is fixed to the lower frame 8.

An air cleaner 21 is provided behind the head pipe 2. A resin fuel tank 22 is provided on the main frames 3. The fuel tank 22 extends above the air cleaner 21. The front portion of the seat 23 is provided on the fuel tank 22. The seat 23 is formed so as to extend backward from the fuel tank 22.

A pivot shaft 25 is provided at the rear portion of the main frame 3. The rear arm 26 is, at its front end portion, supported by the pivot shaft 25 in an up-and-down swingable manner. A rear wheel 27 is rotatably attached to the rear ends of the rear arms 26. A driven sprocket 27a is provided at the rear wheel 27 so that it rotates together with the rear wheel 27. The driven sprocket 27a has a chain 28 engaged therewith. The chain 28 is driven by the engine 13. The driven sprocket 27a and the chain 28 are arranged on the left side with respect to the forward direction (FWD). A rear fender 29 is provided above the rear wheel 27. A rear suspension 30 is provided between the engine 13 and the rear wheel 27.

Engine Structure

Figure 2:
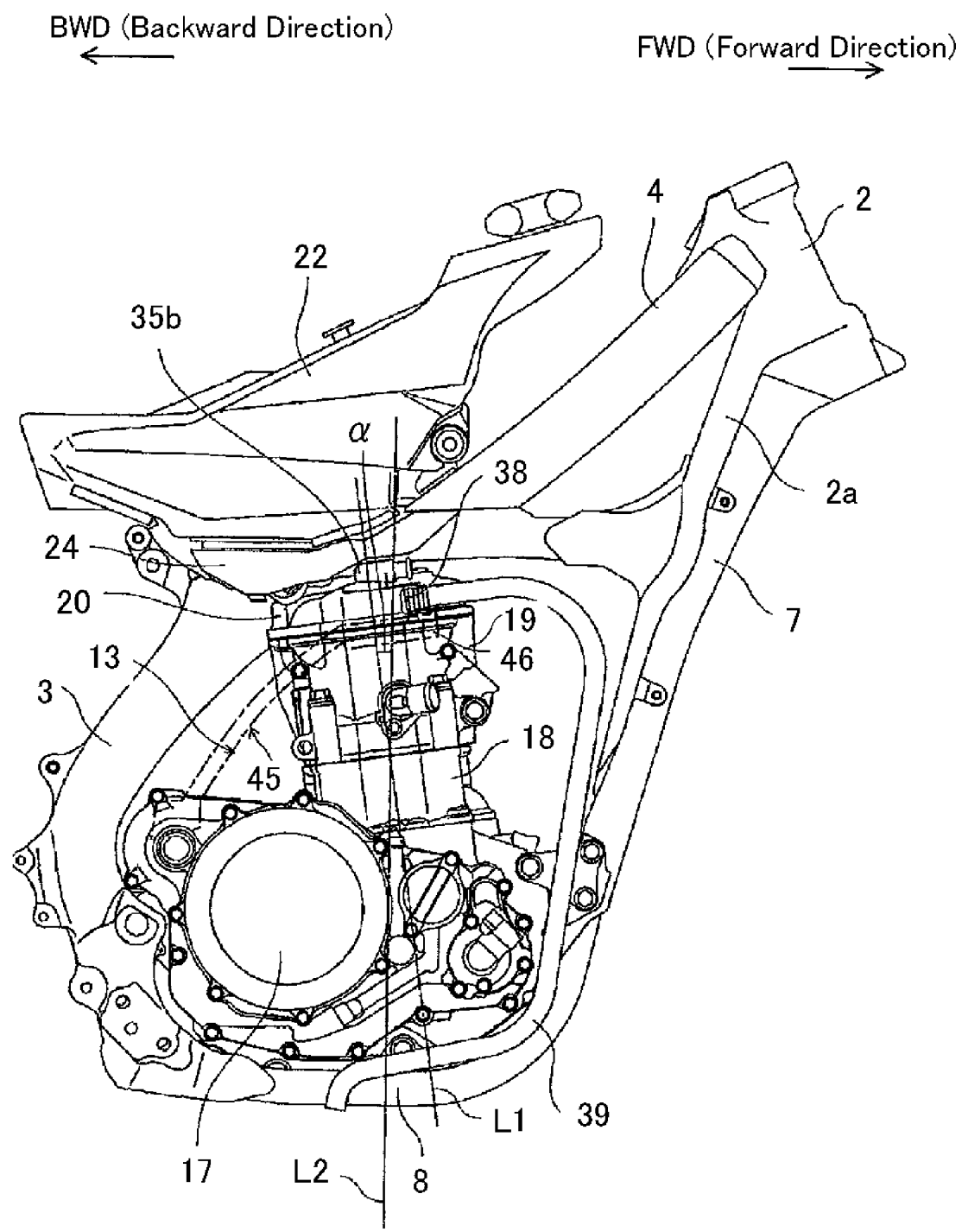
FIG. 2 is a right side view showing an engine of the motorcycle shown in FIG. 1 and its peripheral structure.

FIG. 2 is a side view (right side view with respect to the forward direction (FWD)) of the engine 13. Referring to FIG. 2, the engine 13 is arranged so that the cylinder axis L1 of a cylinder block 18 is inclined backward from the vertical direction L2. The inclination angle a is about 5°. Hence, the engine 13 that is the heaviest component is positioned near the center of gravity of the motorcycle 1.

The engine 13 includes a crankcase 17, a cylinder block 18, a cylinder head 19, and a cylinder cover 20. The cylinder block 18 is provided on the crankcase 17. The cylinder head 19 is provided on the cylinder block 18. The cylinder head cover 20 is attached to the cylinder head 19 so as to cover the cylinder head 19. The cylinder head 19 is provided to block the upper opening of the cylinder block 18.

The motorcycle 1 is further provided with a kick starter lever 45 used to start the engine 13. The kick starter lever 45 has a kick pedal 46. The kick pedal 46 is positioned on the right side of the cylinder head 19 and the cylinder head cover 20.

Figure 3:
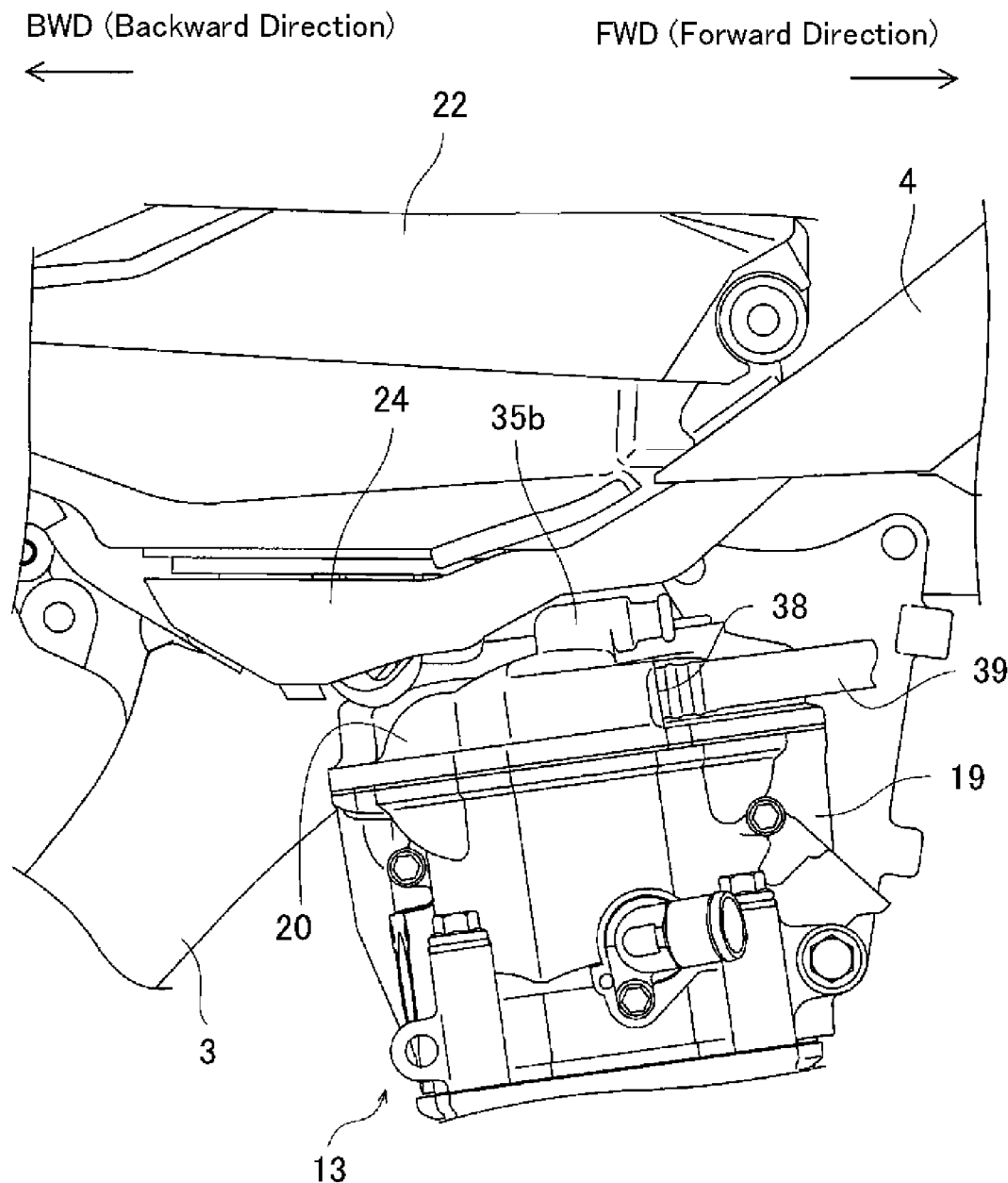
FIG. 3 is an enlarged right side view showing a cylinder head, a fuel tank, and their periphery shown in FIG. 2.

FIG. 3 is an enlarged view showing the cylinder head 19, the cylinder head cover 20, the fuel tank 22 and their periphery. Referring to FIG. 3, the fuel tank 22 is provided closely above the engine 13. More specifically, the fuel tank 22 is arranged near the upper side of the cylinder head cover 20. Therefore, there is almost no space between the fuel tank 22 and the cylinder head cover 20. In the space that barely exists, a plate shaped thermal insulation member 24 is provided. The thermal insulation member 24 is a metal component configured to protect the resin fuel tank 22 against heat from the engine 13. The thermal insulation member 24 is provided apart from the cylinder head cover 20 so that they do not interfere with each other. Since the thermal insulation member 24 is provided, the fuel tank 22 can be arranged close to the engine 13. In this way, the capacity of the fuel tank 22 can be increased.

Referring back to FIG. 1, an intake pipe 44 connected to the cylinder head 19 is provided on the front side of the cylinder head 19. The intake pipe 44 is connected to the air cleaner 21.

An exhaust pipe 31 connected to the cylinder head 19 is provided on the backside of the cylinder head 19. The exhaust pipe 31 has a spiral portion 31a. The spiral portion 31a is provided behind the rear suspension 30 and ahead of the rear wheel 27 and wound around once. The exhaust pipe 31 is connected to a muffler 32.

Figure 4:
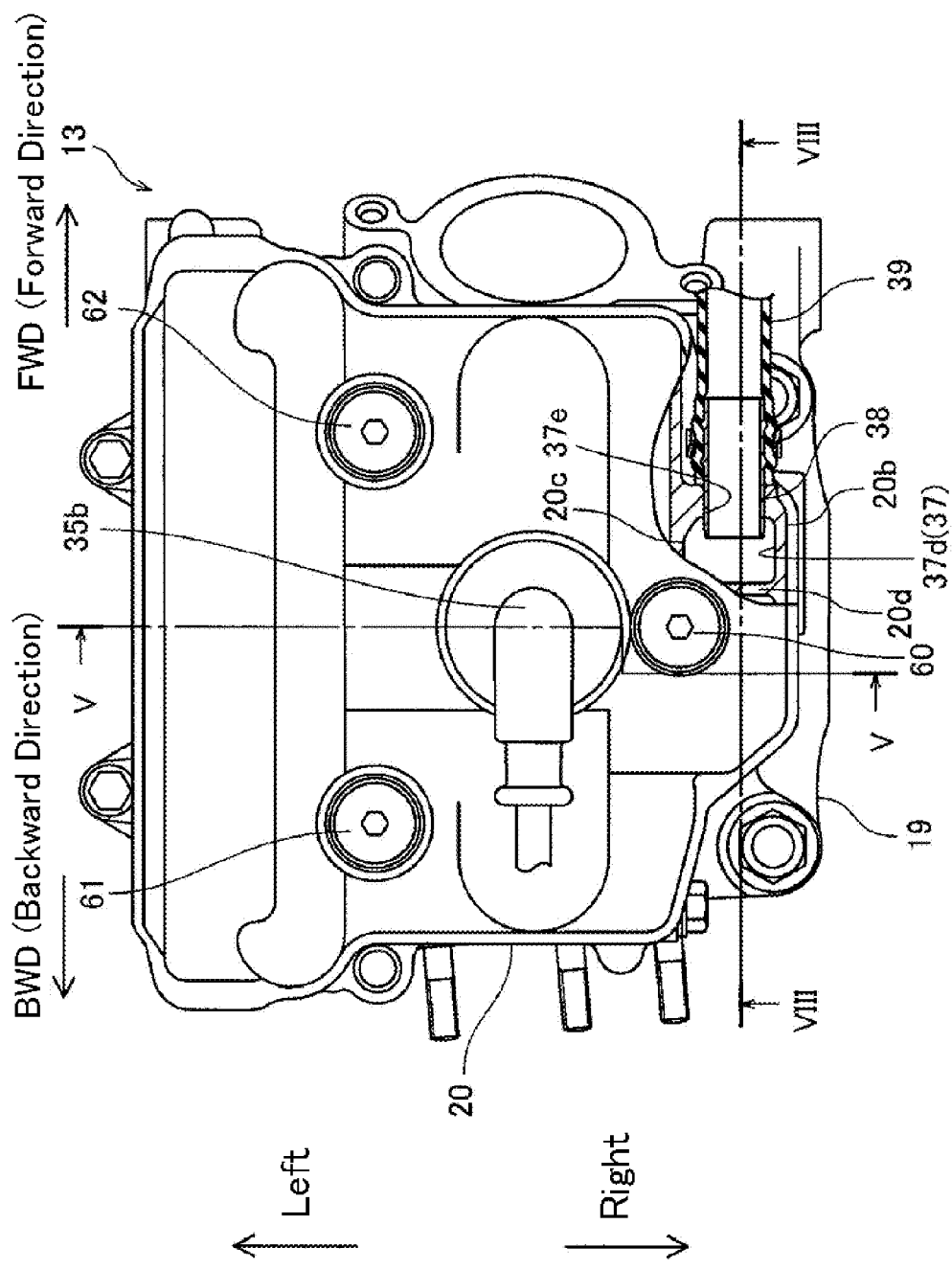
FIG. 4 is a plan view showing the structure of the engine shown in FIG. 1.

FIG. 4 is a top view of the engine 13. Referring to FIG. 4, the cylinder head cover 20 is fixed to the cylinder head 19 with bolts 60 to 62.

Figure 5:
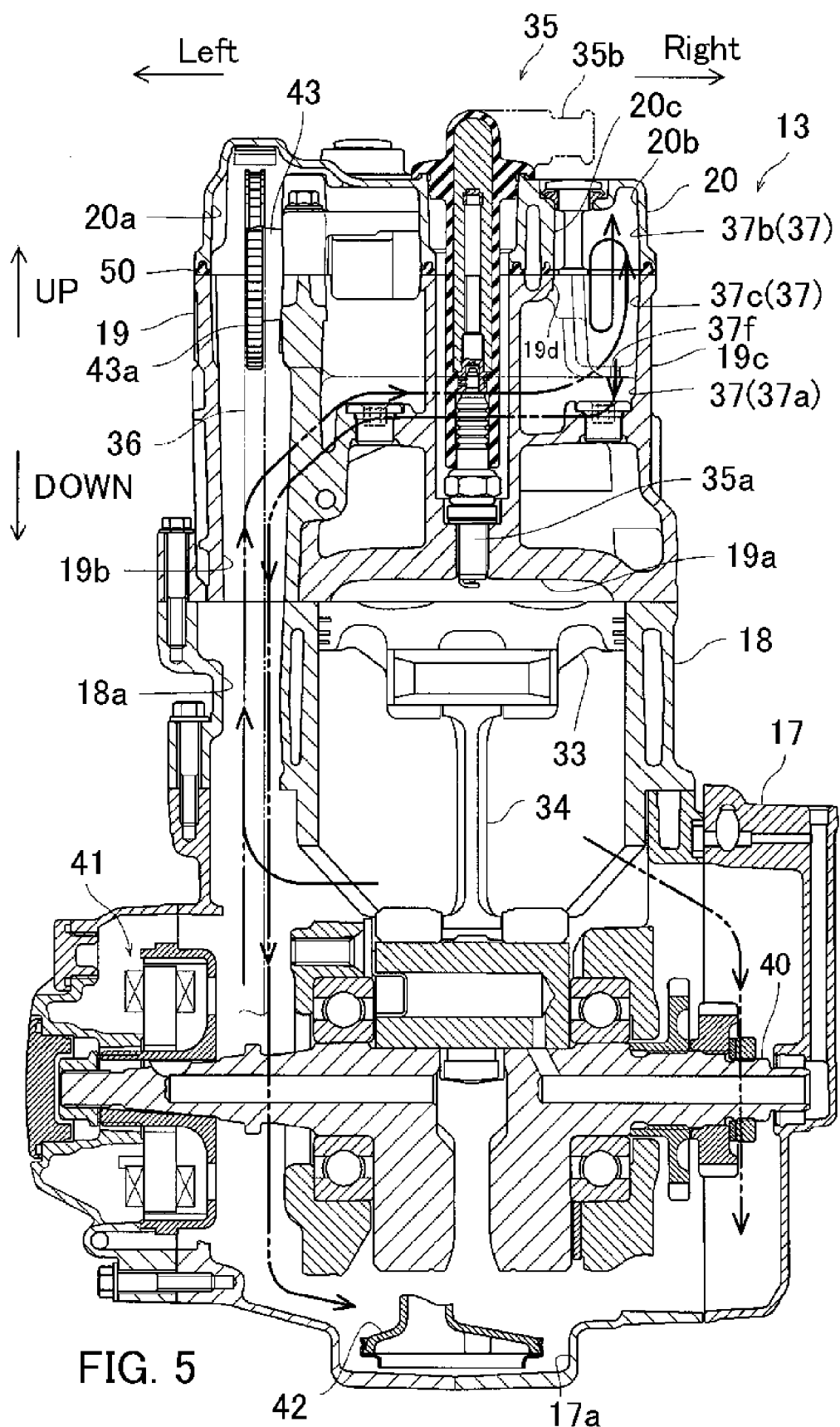
FIG. 5 is a cross-sectional view taken along the line V-V in FIG. 4.

FIG. 5 is a longitudinal cross-sectional view of the engine 13. Referring to FIG. 5, a piston 33 is slidably fitted on the inner circumferential surface of the cylinder block 18. One end of a connecting rod 34 is pivotably attached to the piston 33. The cylinder head 19 has a combustion chamber 19a. The combustion chamber 19a is surrounded by the cylinder head 19 and the piston 33. An ignition plug 35 is attached to the cylinder head 19 and the cylinder head cover 20. More specifically, the plug main body 35a of the ignition plug 35 is fitted into the cylinder head 19 with its tip end exposed from the upper surface of the combustion chamber 19a. Referring to FIGS. 4 and 5, the plug cap 35b that covers the plug main body 35a projects from the upper surface of the cylinder head cover 20 and is hooked on the cylinder head cover 20.

Referring back to FIG. 5, the engine 13 further includes cam chain paths 18a and 19b, a crankshaft 40, a camshaft 43, and a cam chain 36. The cam chain path 18a is formed in the left side portion of the cylinder block 18. The cam chain path 19b is formed in the left side portion of the cylinder head 19. The crankshaft 40 is provided in the crankcase 17. The crankshaft 40 is rotated by the slider crank mechanism of the connecting rod 34. The camshaft 43 is provided in the cylinder head 19. The cam chain 36 is stored in the cam chain paths 18a and 19b and put on the crankshaft 40 and the camshaft 43. A chain case 20a that covers the cam chain path 19b is formed in the left side portion of the cylinder head cover 20.

A generator 41 is provided on the left side of the crankshaft 40. The generator 41 generates electric power by the rotation of the crankshaft 40. An oil pan 17a used to store oil is provided under the crankcase 17. An oil strainer 42 is provided in the oil pan 17a. The oil strainer 42 is an inlet for oil.

Figure 6:
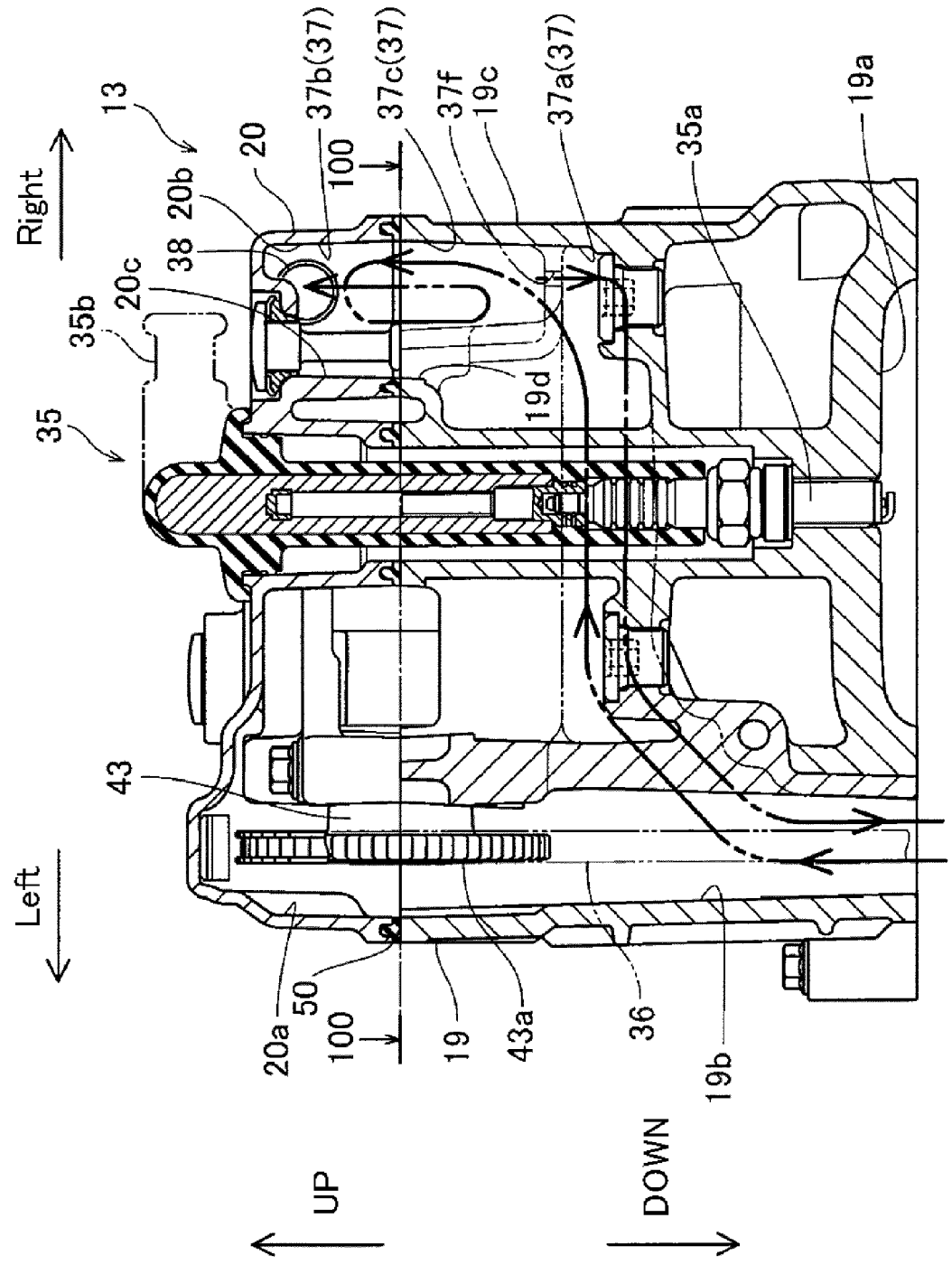
FIG. 6 is an enlarged cross-sectional view of the cylinder head and the cylinder head cover shown in FIG. 5.
Figure 7:
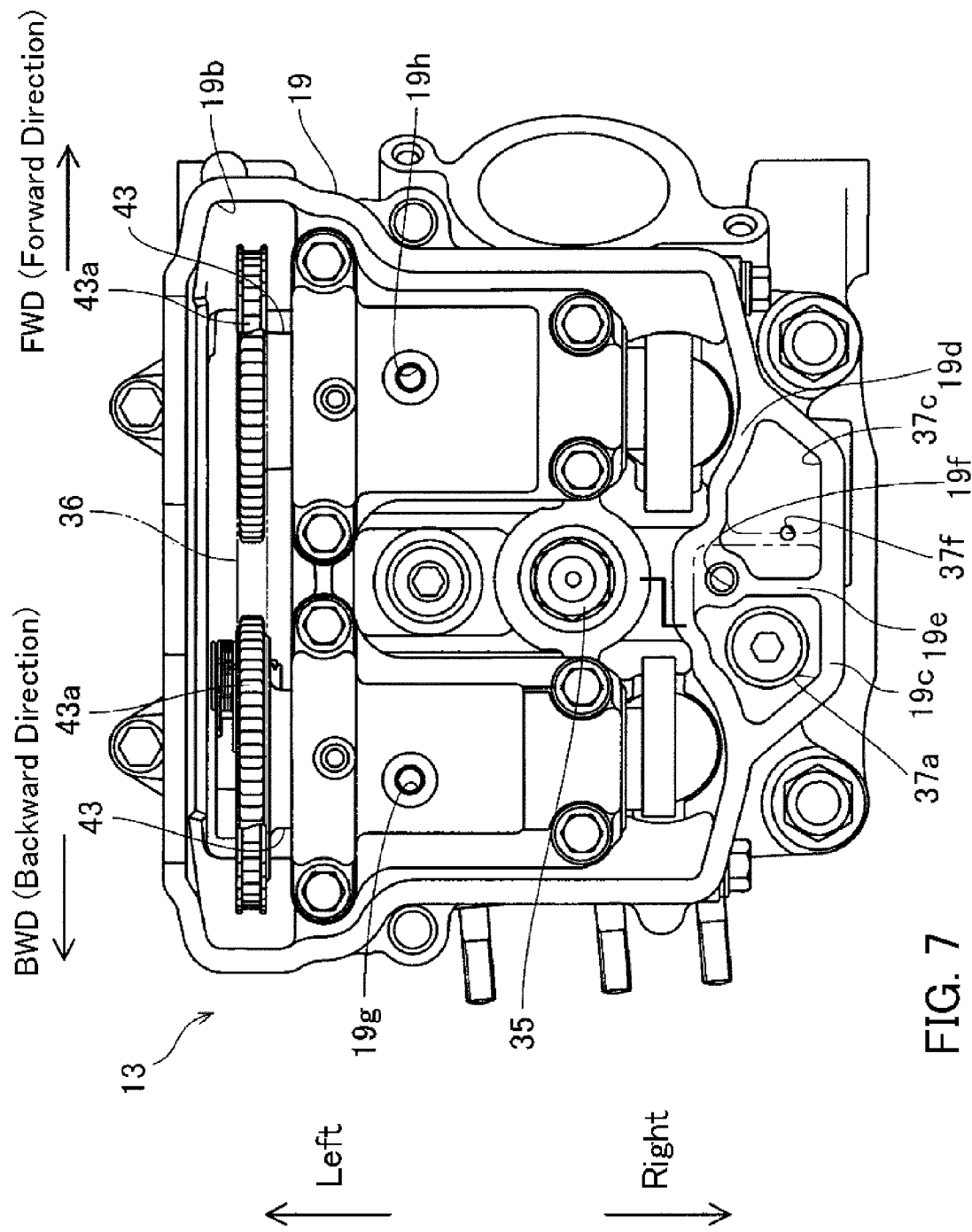
FIG. 7 is a plan view of the internal structure of the cylinder head shown in FIG. 1.

FIG. 6 is a cross-sectional view showing the cylinder head 19 and the cylinder head cover 20. FIG. 7 is a top view of the cylinder head 19 in a state in which the cylinder head cover 20 is removed therefrom. Referring to FIGS. 6 and 7, two camshafts 43 are provided one behind the other in the cylinder head 19. The front side camshaft 43 is configured to drive an intake valve (not shown). The rear side camshaft 43 is configured to drive an exhaust valve (not shown). A gear 43a is provided at the left end of each of the camshafts 43. The cam chain 36 is engaged with both the gears 43a. The lower side of the gear 43a is positioned in the cam chain path 19 and its upper portion is covered with the chain case 20a.

Breather Structure

Referring back to FIG. 5, the crankcase 17 is in communication with the cylinder head 19 via the cam chain path 18a. Therefore, blow-by gas coming into the crankcase 17 through the gap between the outer circumferential surface of the piston 33 and the inner circumferential surface of the cylinder block 18 enters the cylinder head 19 via the cam chain path 18a (see the arrow in FIG. 5). Blow-by gas is largely an unburned fuel-air mixture and includes lubricant oil for the engine 13. In short, the engine 13 has a breather device (or breather) that supplies blow-by gas in the crankcase 17 into the cylinder head 19 via the cylinder block 18.

Figure 8:
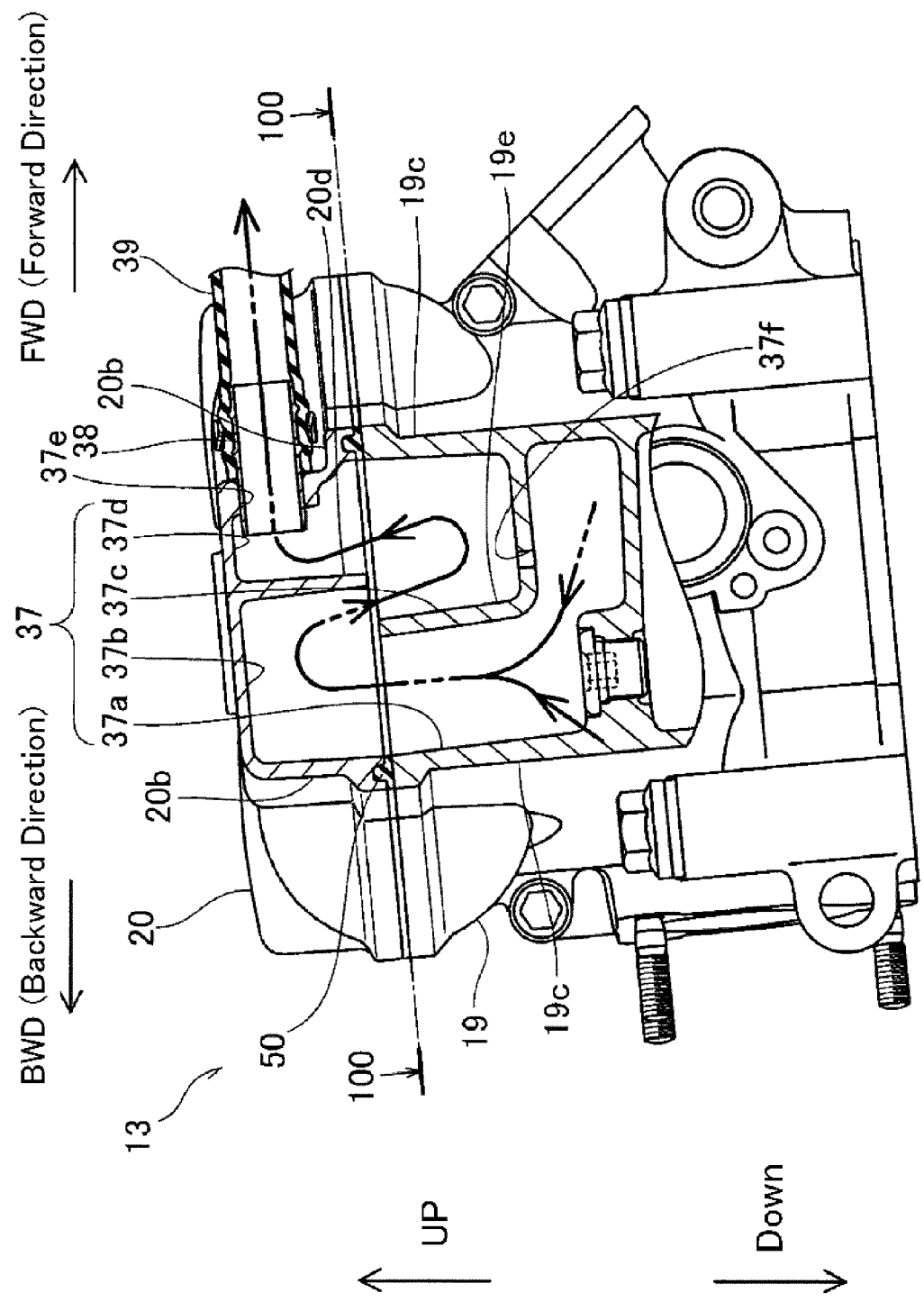
FIG. 8 is a partial cross-sectional view taken along the line VIII-VIII in FIG. 4.

FIG. 8 is a partial cross-sectional view taken along the line VIII-VIII in FIG. 4. Referring to FIGS. 4 to 8, an oil catch tank 37 that separates oil from blow-by gas is provided on a lateral side of the motorcycle 1, more specifically on the right side opposite to the cam chain paths 18a and 19b. The oil catch tank 37 is arranged between two camshafts 43. The oil catch tank 37 is formed by the cylinder head 19 and the cylinder head cover 20.

Figure 9:
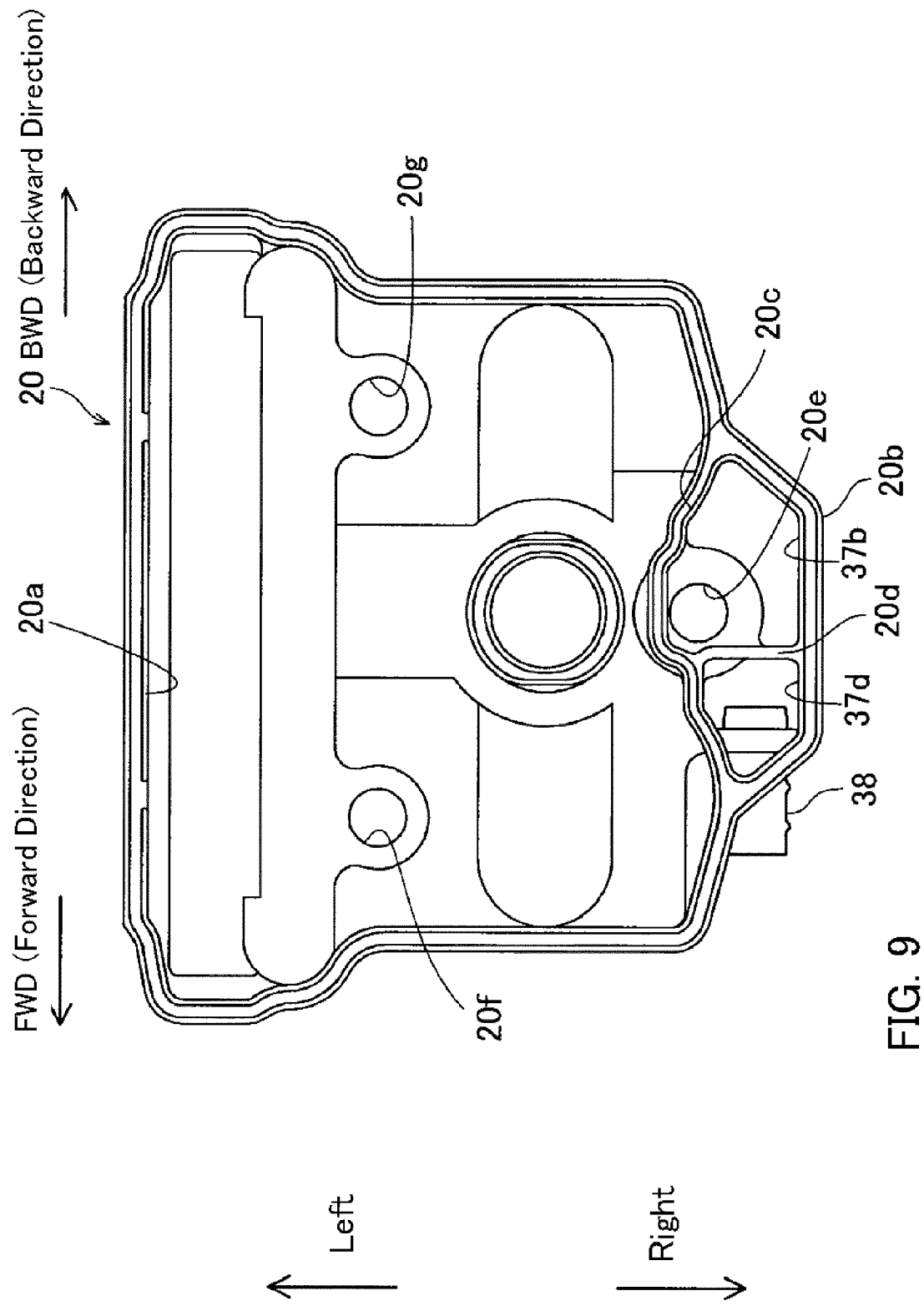
FIG. 9 is a bottom view of the internal structure of the cylinder head cover shown in FIG. 1.

FIG. 9 is a bottom view of the cylinder head cover 20. Referring to FIGS. 7 to 9, the oil catch tank 37 includes four breather chambers 37a, 37b, 37c, and 37d. A partition 19e is provided between the breather chambers 37a and 37c. A partition 20d is provided between the breather chambers 37b and 37d. The breather chambers 37a and 37d form lower breather chambers. The breather chambers 37b and 37d form upper breather chambers. The lower breather chambers 37a and 37c are formed in the cylinder head 19. The upper breather chambers 37b and 37d are formed in the cylinder head cover 20.

As shown in FIG. 8, the partition 19e extends so as to project backward (BWD) and then upward from the right side wall 19c of the cylinder head 19. The partition 19e has a substantially L-shaped cross-section when viewed from the right side. The partition 20d is formed so as to project downward from the ceiling of the cylinder head cover 20. The partitions 19e and 20d complicate the distribution path of blow-by gas in the oil catch tank 37. As the distribution path is prolonged, oil can effectively be separated from blow-by gas.

The upper end of the partition 19e and the lower end of the partition 20d are positioned almost at the same height. The upper end of the partition 19e and the lower end of the partition 20d are formed so as to extend to a joint surface 100 between the cylinder head 19 and the cylinder head cover 20. The partition 19e and the partition 20d are arranged at different positions from each other. More specifically, the upward extending portion of the partition 19e is positioned apart from the partition 20d in the front-and-rear direction along the joint surface 100. The upper end of the partition 19e and the lower end of the partition 20d do not contact each other when the cylinder head cover 20 is fixed to the cylinder head 19. The upper end of the partition 19e is positioned almost flush with the lower end of the partition 20d, so that blow-by gas does not directly come from the breather chamber 37a into the breather 37c by skipping the breather chamber 37b or from the breather chamber 37b into the breather chamber 37d by skipping the breather chamber 37c.

The breather chamber 37a is configured to flow blow-by gas from the cam chain path 19b to the side of the cylinder head cover 20 (upper side). The breather chamber 37b is configured to flow the blow-by gas from the breather chamber 37a to the side of the cylinder head 19 (lower side). The breather chamber 37c is configured to flow the blow-by gas from the breather chamber 37b to the side of the cylinder head cover 20 (upper side). The breather chamber 37d has an exhaust outlet 37e. A breather pipe 38 is connected to the exhaust outlet 37e. The breather chamber 37d is configured to discharge the blow-by gas from the breather chamber 37c to the outside via the breather pipe 38.

Referring to FIGS. 4 to 6 and 8, the exhaust outlet 37e is provided at the right side portion 20b of the cylinder head cover 20. Referring to FIGS. 5 to 8, an oil discharge hole 37f for returning oil separated by the breather chambers 37c and 37d in the downward direction is provided at the bottom of the breather chamber 37c.

As shown in FIG. 7, the breather chambers 37a and 37c are provided so as to project in the right side portion of the cylinder head 19. As shown in FIG. 9, the breather chambers 37b and 37d are provided so as to project in the right side portion of the cylinder head cover 20. Therefore, the oil catch tank 37 is provided at the side of the kick pedal 46 shown in FIG. 2.

Referring back to FIG. 6, the upper end surface of the right side wall 19c of the cylinder head 19 and the lower end surface of the right side wall 20b of the cylinder head cover 20 are formed so as to oppose each other when the cylinder head cover 20 is fixed to the cylinder head 19. The upper end surface of the inner wall 19d of the cylinder head 19 and the lower end surface of the inner wall 20c of the cylinder head cover 20 are formed so as to oppose each other when the cylinder head cover 20 is fixed to the cylinder head 19. A gasket 50 is inserted between the upper end surface of the cylinder head 19 and the lower end surface of the cylinder head cover 20 so that airtight-ness is secured between the cylinder head 19 and the cylinder head cover 20.

Referring back to FIG. 8, the breather pipe 38 is provided at the cylinder head cover 20 so as to discharge blow-by gas from the breather chamber 37d. The breather pipe 38 extends substantially perpendicularly to the cylinder axis L1 of the engine 13 (see FIG. 2). More specifically, the breather pipe 38 is arranged substantially in parallel to the joint surface 100 of the cylinder head 19 and the cylinder head cover 20 and extends forward (FWD). In this preferred embodiment, the oil catch tank 37 is provided on one side portion of the cylinder head 19 and the cylinder head cover 20, which makes it easy to arrange the breather pipe 38 to extend substantially parallel to the joint surface 100 from the cylinder head cover 20 as compared to the case where the oil catch tank 37 is provided in the central portion of the cylinder head 19 and the cylinder head cover 20.

The breather pipe 38 is connected to a breather hose 39. Referring back to FIG. 2, the breather hose 39 has one opening end connected to the breather pipe 38 and the other opening end positioned under the engine 13. The breather hose 39 extends forward, then downward along the down frame 7 at the front of the engine 13 and to the bottom of the engine 13. In this way, blow-by gas in the engine 13 is discharged outside. Since the breather pipe 38 extends forward, the thermal insulation member 24 and the breather pipe 38 can be arranged so that they do not interfere with each other.

Referring back to FIG. 7, in the region where the inner wall 19d of the cylinder head 19 and the partition 19e of the oil catch tank 37 cross each other, a screw hole 19f for fixing the cylinder head cover 20 to the cylinder head 19 is provided. As shown in FIGS. 7 and 9, the cylinder head cover 20 has a screw insert hole 20e in a position corresponding to the screw hole 19f of the cylinder head 19. The bolt 60 shown in FIG. 4 is screwed into the screw hole 19f through the screw insert hole 20e shown in FIG. 4, so that the cylinder head cover 20 is fixed to the cylinder head 19. In this way, when the cylinder head cover 20 is fixed to the cylinder head 19 as shown in FIG. 6, the contact pressure between the upper end surface of the right side wall 19c of the cylinder head 19 and the lower end surface of the right side wall 20b of the cylinder head cover 20 increases in the vicinity of the oil catch tank 37 and the contact pressure between the upper end surface of the inner wall 19d of the cylinder head 19 and the lower end surface of the inner wall 20c of the cylinder head cover 20 increases.

As shown in FIG. 7, in the cylinder head 19, screw holes 19g and 19h formed at a prescribed distance are provided between the cam chain path 19b and a portion having the ignition plug 35. As shown in FIGS. 7 and 9, in the cylinder head cover 20, screw insert holes 20f and 20g are provided at positions corresponding to the screw holes 19g and 19h of the cylinder head 19. As shown in FIGS. 4, 7 and 9, as the bolt 61 is screwed into the screw hole 19g through the screw insert hole 20g and the bolt 62 is screwed into the screw hole 19h through the screw insert hole 20f. In this way, the cylinder head cover 20 is fixed to the cylinder head 19.

Blow-By Gas and Oil Distribution Path

In this section, blow-by gas and an oil distribution path will be described.

Referring back to FIG. 5, blow-by gas is generated in the combustion chamber 19a and enters the crankcase 17 through the gap formed between the inner circumferential surface of the cylinder block 18 and the outer circumferential surface of the piston 33. The blow-by gas then comes into the cylinder head 19 through the cam chain paths 18a and 19b. Referring back to FIG. 6, the incoming blow-by gas flows from the left side to the right side in the cylinder head 19. The oil catch tank 37 is provided on the opposite side to the cam chain paths 18a and 19b, and therefore the distribution path for the blow-by gas is long. The blow-by gas flows from the cam chain path 19b to the oil catch tank 37 and comes into the breather chamber 37a.

Referring back to FIG. 8, the blow-by gas entered the breather chamber 37a comes into the breather pipe 38 via the breather chambers 37b, 37c, and 37d and is discharged outside the engine 13 from the breather pipe 38. The blow-by gas flows through the breather chambers 37a to 37d while colliding against the partitions 19e and 20d and the like, which causes separation of oil from the blow-by gas. After the sufficient oil separation, the blow-by gas is discharged outside the engine 13 from the breather hose 39 through the breather pipe 38.

Meanwhile, referring to FIG. 6, the oil separated from the blow-by gas is discharged from the oil discharge hole 37f of the oil catch tank 37 and comes into the cam chain path 19b. Referring to FIG. 5, the oil goes down along the inner wall surfaces of the cam chain paths 19b and 18a to come into the crankcase 17 and returns to the oil pan 17a.

As shown in FIG. 2, the engine 13 is inclined backward, and as shown in FIG. 8, the breather pipe 38 is arranged so as to extend forward in the direction along the joint surface 100 between the cylinder head 19 and the cylinder head cover 20. Therefore, even when oil is separated from blow-by gas in the breather pipe 38, the oil is returned to the engine 13.

Effects of the Preferred Embodiments

As mentioned above, in some preferred embodiments of the present invention, the fuel tank 22 is provided closely above the engine 13, so that there is almost no space between the fuel tank 22 and the engine 13. In addition, the engine 13 is a DOHC type engine, and therefore it is extremely difficult to provide the oil catch tank 37 in the cylinder head 19. However, the oil catch tank 37 is provided on the side portion of the cylinder head 19 and the cylinder head cover 20. The lower breather chambers 37a and 37c of the oil catch tank 37 are formed in the cylinder head 19. The upper breather chambers 37b and 37d are formed in the cylinder head cover 20. Therefore, the oil catch tank 37 is arranged at a high level.

In addition, the oil catch tank 37 is arranged at the opposite side of the cam chain paths 18a and 19b and between two cam shaft 43, and therefore the capacity of the oil catch tank 37 can be increased.

Unlike the case where the oil catch tank 37 is formed by one of the cylinder head 19 and the cylinder head cover 20, the height of the oil catch tank 37 can be raised. Therefore, the distribution path for blow-by gas can be made longer. The oil catch tank 37 is formed by the cylinder head 19 and the cylinder head cover 20. Therefore, the number of components can be reduced.

Other Preferred Embodiments

In the above-described preferred embodiments, the oil catch tank 37 is provided on the right side portion of the cylinder head 19 and the cylinder head cover 20. The oil catch tank 37, however, can be provided on the left side portion, the front side portion or rear side portion of the cylinder head 19 and the cylinder head cover 20. In the above-described preferred embodiments, the oil catch tank 37 is provided in a part of the side portion of the cylinder head 19 and the cylinder head cover 20. However, in other embodiments, it can be provided, e.g., in the entirety of the side portion. In the above-described preferred embodiments, the oil catch tank 37 is provided on the right side of the engine 13, and the cam chain paths 18a and 19b are provided on the left side of the engine 13. However, conversely to the above-arrangement, it can be configured such that the oil catch tank 37 is provided on the left side of the engine 13 and the cam chain paths 18a and 19b are provided on the right side of the engine 13.

In the above-described preferred embodiments, the breather pipe 38 is made of another component different from the cylinder head cover 20. However, the breather pipe 38 can formed integrally with the cylinder head cover 20. In the above-described preferred embodiments, the breather hose 39 extends down to the lower side of the engine 13. However, the breather hose 39 can be connected to the air cleaner 21, so that blow-by gas can be returned to the air cleaner 21. In the above-described preferred embodiments, the engine 13 is inclined backward. However, the engine 13 can be inclined forward or provided upright.

In this application, the language "straddle type vehicle" includes, for example, motorcycles, snow mobiles, all terrain vehicles (ATVs), four-wheeled buggies, etc., which often involve vehicles that can be turned, tilted or otherwise affected by the driver's weight position. The terminology straddle type vehicle is not limited to vehicles in which a driver and/or passenger sits with legs straddling on opposite sides of a portion of the vehicle (such as, e.g., straddling a seat), but also includes vehicles in which a driver and/or passenger's legs can extend across a substantial portion of the width of the passenger-supporting portion of the vehicle, such that, by way of example, while a driver may sit with legs forward in a scooter, a scooter is understood to be a straddle type vehicle due to the ability of a driver and/or passenger to extend their legs across a substantial portion of the width of the passenger-supporting portion. In this manner, the driver of a straddle type vehicle is typically able to distribute their weight widthwise across the vehicle and to turn, tilt or otherwise influence the vehicle by the driver's weight position.

Broad Scope of the Invention

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A straddle type vehicle, comprising:
an OHC (Over Head Camshaft) engine; and
a fuel tank provided closely above the OHC engine,
wherein the OHC engine includes:
a crankcase;
a cylinder block provided on the crankcase;
a cylinder head provided on the cylinder block;
a cylinder head cover attached to the cylinder head so as to cover the cylinder head; and
an oil catch tank arranged on a side portion of the cylinder head and the cylinder head cover to separate oil from gas supplied from the crankcase via the cylinder block,
wherein the oil catch tank includes:
a lower breather chamber formed in the cylinder head; and
an upper breather chamber formed in the cylinder head cover.

2. The straddle type vehicle as recited in claim 1, wherein the oil catch tank is arranged on a lateral side of the straddle type vehicle.

3. The straddle type vehicle as recited in claim 2, further comprising a kick starter lever having a kick pedal,
wherein the oil catch tank is arranged on a side of the kick pedal.

4. The straddle type vehicle as recited in claim 1,
wherein the OHC engine further includes:
a cam chain path formed on a side portion of the cylinder block and the cylinder head;
a crankshaft provided in the crankcase;
a camshaft provided in the cylinder head; and a cam chain stored in the cam chain path and put on both the crankshaft and the camshaft, and wherein the oil catch tank is provided on a side opposite to the cam chain path.

5. The straddle type vehicle as recited in claim 4,
wherein the number of the camshaft is two, and
wherein the oil catch tank is arranged between the two camshafts.

6. The straddle type vehicle as recited in claim 1,
wherein the lower breather chamber includes:
a first breather chamber;
a second breather chamber; and
a first partition provided between the first and second breather chambers, and
wherein the upper breather chamber includes:
a third breather chamber;
a fourth breather chamber; and
a second partition provided between the third and fourth breather chambers and arranged in a position different from that of the first partition.

7. The straddle type vehicle as recited in claim 6,
wherein the upper end of the first partition is positioned at almost the same height as the lower end of the second partition.

8. The straddle type vehicle as recited in claim 1,
wherein the cylinder head further includes a fixing portion provided near the oil catch tank, the fixing portion being configured to fix the cylinder head cover to the cylinder head.

9. The straddle type vehicle as recited in claim 1,
wherein the OHC engine further includes a breather pipe provided at the cylinder head cover to discharge gas from the upper breather chamber, the breather pipe extending substantially perpendicularly to a cylinder axis of the OHC engine.

10. The straddle type vehicle as recited in claim 9,
wherein the breather pipe extends from the cylinder head cover to a front of the straddle type vehicle.

11. The straddle type vehicle as recited in claim 10,
wherein the OHC engine further includes a breather hose having one opening end connected to the breather pipe and the other opening end positioned under the OHC engine, the breather hose extending from the breather pipe via a front of the OHC engine to a bottom of the OHC engine.

12. The straddle type vehicle as recited in claim 1, further comprising a thermal insulation member provided between the cylinder head cover and the fuel tank.

13. The straddle type vehicle as recited in claim 1, wherein the OHC engine is inclined backward.

14. The straddle type vehicle as recited in claim 13, further comprising:
an intake pipe connected to the cylinder head and provided in front of the engine; and
an exhaust pipe connected to the cylinder head and provided behind the engine.

15. A straddle type vehicle equipped with an OHC (Over Head Camshaft) engine and a fuel tank provided closely above the OHC engine including a crankcase, a cylinder block, a cylinder head, and a cylinder head cover arranged one above the other, the straddle type vehicle comprising:
an oil catch tank for separating oil contained in gas discharged from the crankcase; and
a passage which communicates the crankcase with the oil catch tank,
wherein the oil catch tank is formed as one side portion of the cylinder head and the cylinder head cover and provided with a plurality of breather chambers including at least one lower breather chamber formed in the cylinder head and one upper breather chamber formed in the cylinder head cover, the plurality of breather chambers being arranged so that the gas flows in a zigzag manner therethrough.

16. The straddle type vehicle as recited in claim 15,
wherein the oil catch tank is arranged on a lateral side of the straddle type vehicle.

17. The straddle type vehicle as recited in claim 15,
wherein the OHC engine further includes:
a cam chain path formed on a side portion of the cylinder block and the cylinder head;
a crankshaft provided in the crankcase;
a camshaft provided in the cylinder head; and
a cam chain stored in the cam chain path and put on both the crankshaft and the camshaft, and
wherein the oil catch tank is provided on a side opposite to the cam chain path.

18. The straddle type vehicle as recited in claim 15,
wherein the lower breather chamber includes:
a first breather chamber;
a second breather chamber; and
a first partition provided between the first and second breather chambers, and
wherein the upper breather chamber includes:
a third breather chamber;
a fourth breather chamber; and
a second partition provided between the third and fourth breather chambers and arranged in a position different from that of the first partition.

19. The straddle type vehicle as recited in claim 18,
wherein the upper end of the first partition is positioned at almost the same height as the lower end of the second partition.

20. The straddle type vehicle as recited in claim 15, further comprising a thermal insulation member provided between the cylinder head cover and the fuel tank.

* * * * *